A. LONSON.
TRAVELER'S CHECK.
APPLICATION FILED AUG. 30, 1917. RENEWED DEC. 3, 1919.
1,329,250.
Patented Jan. 27, 1920.
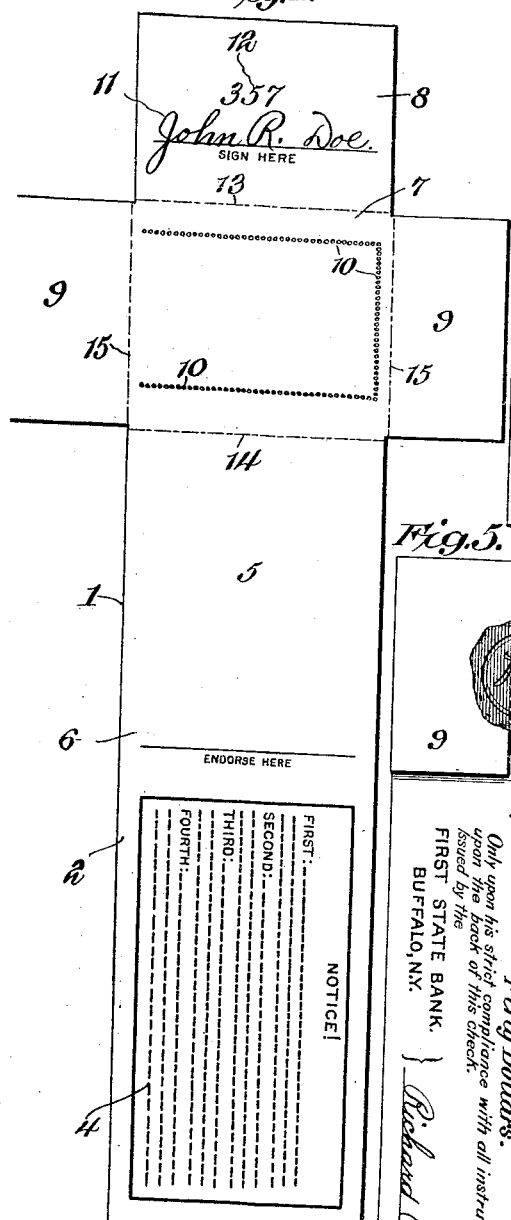
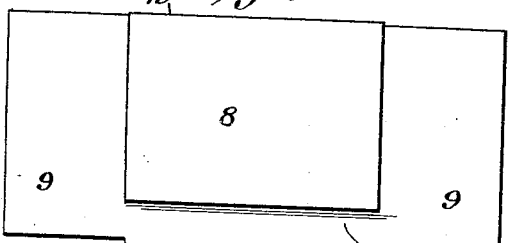
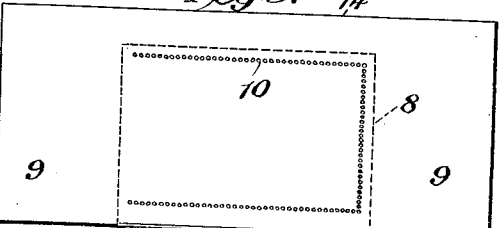
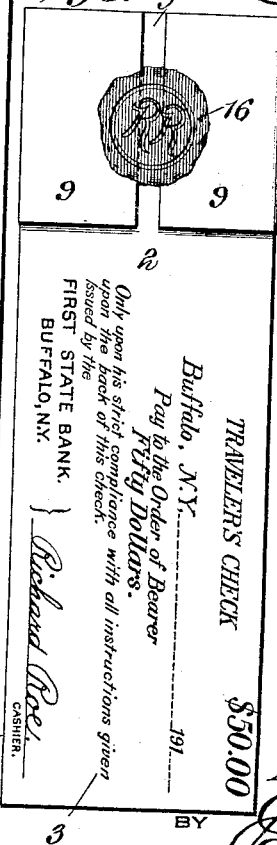
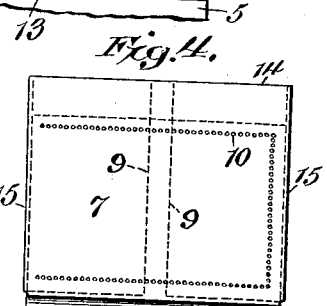
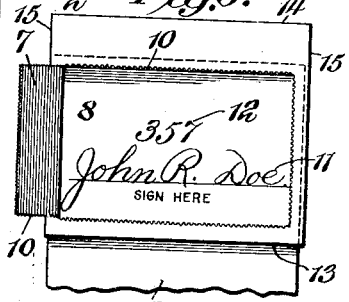
WITNESSES
Howard D. Orr.
H. T. Chapman.
INVENTOR,
Albert Lonson,
BY
E. G. Siggers
ATTORNEY

UNITED STATES PATENT OFFICE.

ALBERT LONSON, OF CALLAWAY, MINNESOTA.

TRAVELER'S CHECK.

1,329,250.   Specification of Letters Patent.   Patented Jan. 27, 1920.

Application filed August 30, 1917, Serial No. 188,963. Renewed December 3, 1919. Serial No. 342,302.

*To all whom it may concern:*

Be it known that I, ALBERT LONSON, a citizen of the United States, residing at Callaway, in the county of Becker and State of Minnesota, have invented a new and useful Traveler's Check, of which the following is a specification.

This invention has reference to travelers' checks, and its object is to insure the identification of the person presenting the check as entitled to have the check cashed.

In designating the invention as a traveler's check it is to be understood that such a specific reference to the invention is for convenience of description, since the same arrangement may in effect be used in connection with other identification means and other papers than travelers' checks. With this explanation and understanding the invention will hereinafter be referred to simply as a traveler's check and without thereby limiting the invention to such particular use.

By means of the present invention each check used contains the signature of the recipient and some other readily reproducible identification means or mark, and both the signature and the mark are then so inclosed and sealed that they are thoroughly hidden, and unauthorized access to such identification means is effectively prevented.

By employing at least two different means of identification with both hidden from view the possibility of a skilled penman being able to forge the signature of the person to whom the check is issued, provided such forger should know the signature of the party, is nullified, because the forger would have no way of ascertaining the other identification means which may comprise some mark or the like known only to the proper holder of the check and the proper officer of the bank of issue.

The invention will be best understood from a consideration of the following detailed description, taken in connection with the accompanying drawings forming part of this specification, with the further understanding that while the drawings show a practical form of the invention the latter is not confined to any strict conformity with the showing of the drawings, but may be changed and modified so long as such changes and modifications come within the scope of the appended claims.

In the drawings:—

Figure 1 is a display view of a blank traveler's check showing the signature and other identification mark of the person to whom the check is issued.

Fig. 2 is a view of a portion of the showing of Fig. 1 indicating the first step in sealing up the check.

Fig. 3 is a view similar to Fig. 2 but indicating a further advance in the sealing operation.

Fig. 4 shows the completed check as seen from the same face as appears in Fig. 3 and also showing the indorsement on the check.

Fig. 5 is a view of the check of Fig. 4 disclosing the other face and showing the manner of sealing the parts together.

Fig. 6 is a view similar to Fig. 4 but disclosing the original signature.

Referring to the drawings there is shown a blank 1 constituting the check before it is filled out. The check has a body portion 2 which upon one face 3 has information as to the value of the check, the place and date of issue, and the concern issuing it, together with appropriate signatures placed thereon when the check is issued. On the opposite face 4 of the body of the check there may be printed instructions as to the mode of procedure in paying the check. This is usually in the form of a printed notice of the requirements, and this will be hereinafter referred to in describing the manner of using the invention.

At one end of the body of the check is an extension 5 which on one face, say, the face corresponding to the face 4 of the body of the check, there is provided a space 6 for the indorsement of the person to whom the check is to be paid, with such legend as may be necessary for the instruction of the holder of the check. This legend usually consists of the words "Indorse here."

At that end of the extension 5 remote from the body of the check there is a further extension in the form of successive tab portions 7, 8, in line one with the other and in line with the extension 5 and the body of the check. Projecting laterally from the tab 7 are other tabs 9, one on each side of the tab 7. Furthermore, the tab 7 is formed with appropriate weakened lines 10 constituting tear lines and these may be continued about three sides of a rectangle, or be arranged in any suitable way to permit the loosening of a flap from the tab 7 to expose an underlying part.

Upon one face of the tab 8 there is indicated a space for the signature of the person to whom the check is issued, and this space is usually accompanied by a legend such as "Sign here."

Assuming that a traveler desires to purchase some travelers' checks from a bank, the cashier is requested to issue to the traveler a certain number of checks of chosen amounts for which the traveler pays. By way of example, let it be assumed that the traveler wishes ten checks of fifty dollars each. The bank official fills in ten blanks 1 with the amounts and such other matter as may be necessary, and then has the person to whom the checks are issued sign each blank on the tab 8 at the point provided for such signature. In addition to the signature indicated at 11, the recipient of the checks places upon each check some identification mark, preferably a number 12, which number is different for each check from the numbers used on the other checks.

Now, the bank official first folds the tab 8 upon the tab 7 lengthwise of the check in a manner to bring the surface containing the signature 11 against the adjacent face of the tab 7. The folded tabs are then together folded upon the extension 5, the respective folds being along the lines 13 and 14, which lines may or may not be indicated in the blank. This provides two thicknesses of material against the extension 5, the tab 8 being confined between the tab 7 and the extension 5 with the tab 7 exposed to view and showing the tear lines 10.

Now, the tabs 9 are folded along respective lines 15 where these tabs join the tab 7, so as to lie against that face of the extension 5 remote from the tabs 7 and 8. The tabs 9 have their free ends brought together or into close relation and are then joined by sealing material 16, or in any other suitable way, which will readily give evidence of an attempt to unseal the folded up portion of the check.

As a further precaution, but which in itself does not have to do with the check *per se*. the bank may issue a certificate of deposit in the nature of a receipt to the party to whom the checks are issued, and this certificate may have spaces for further certification by the banks paying the checks.

When the holder of a traveler's check applies to a bank for the cashing of the check, the proper officer has the holder of the check place his signature at the point provided for indorsement, such signature appearing at 17 in Fig. 4. The person indorsing the check is also required to write down the identification number or other identification indicia previously agreed upon at the bank of issue. Such number is shown at 18 in Fig. 4.

Now, the bank official receiving the check with the alleged signature and identification number tears open the proper portion of the tab 7 along the weakened lines 10, whereupon the original signature 11 and number 12 are exposed to view. If the second signature agrees with the original signature and the second number agrees with the original number and the signatures were evidently written by the same person, as would be quite apparent to a skilled bank official, the identification would unquestionably be satisfactory, so that the check could be cashed without hesitation.

Of course, the sealing 16 must be intact and the tear lines 10 must also be intact.

The double identification renders correct identification practically certain. It is quite possible that a skilled penman observing the signature of the holder of the checks, say, upon a hotel register or elsewhere, might obtain possession of the checks and then present them at a bank and if the only identification called for was the signature of the holder of the checks, such unscrupulous person might be able to have the checks cashed even though the name of the party to whom the checks were issued is not visible upon the checks. However, if there be another mode of identification arbitrarily chosen and having no possible connection with the subject-matter of the checks, and with such secret and arbitrary identification hidden from view and unknown to any one except the proper holder of the check and the bank of issue, the chance of fraudulently cashing the checks would be practically eliminated, since no amount of skill or observation would enable a fraudulent holder of the checks without opening them to obtain a clue as to the secret identification mark other than the signature. If the seal of the check be broken the evidence of such breaking becomes apparent to a skilled bank official, and consequently the attempted fraud is frustrated.

It will be understood that it may be found desirable under some circumstances to rely entirely upon the signature of the recipient for identification so that the recipient would not have need of other identification than this signature.

What is claimed is:—

1. A traveler's check containing printed matter and blank spaces to be filled in to complete the check, said check having an extension lengthwise of the check and foldable and refoldable upon itself toward the body of the check, with flanking tabs on opposite sides for inclosing and ultimately sealing the folded and refolded portions, the first of the foldable portions of the extension in order of folding having a designated space adapted to receive identification means to be applied thereto by the person to whom the check is issued, and the second of the foldable portions in order having a tearable part of less area than said foldable portion, whereby the said identification means may be exposed to view, and the check also being adapted for the subsequent reception of identification means in close position to the first-named identification means in the completed check.

2. A traveler's check containing printed matter and blank spaces to be filled in to complete the check, said check having an extension lengthwise of the check and foldable and refoldable upon itself toward the body of the check, with flanking tabs on opposite sides for inclosing and ultimately sealing the folded and refolded portions, the first of the foldable portions of the extension in order of folding having a designated space adapted to receive identification means to be applied thereto by the person to whom the check is issued, and the second of the foldable portions in order having a tearable part of less area than said foldable portion, whereby the said identification means may be exposed to view, and the check also being adapted for the subsequent reception of identification means in close position to the first-named identification means in the completed check, the tearable portion of the second-named foldable part of the check being defined by weakened lines constituting tear lines.

In testimony that I claim the foregoing as my own I have hereto affixed my signature in the presence of two witnesses.

ALBERT LONSON.

Witnesses:
 TOM LONSON,
 D. E. BROWN.